Aug. 8, 1939.   E. R. PEDRAZZO   2,168,420
LOOM
Filed Aug. 21, 1937   10 Sheets-Sheet 2
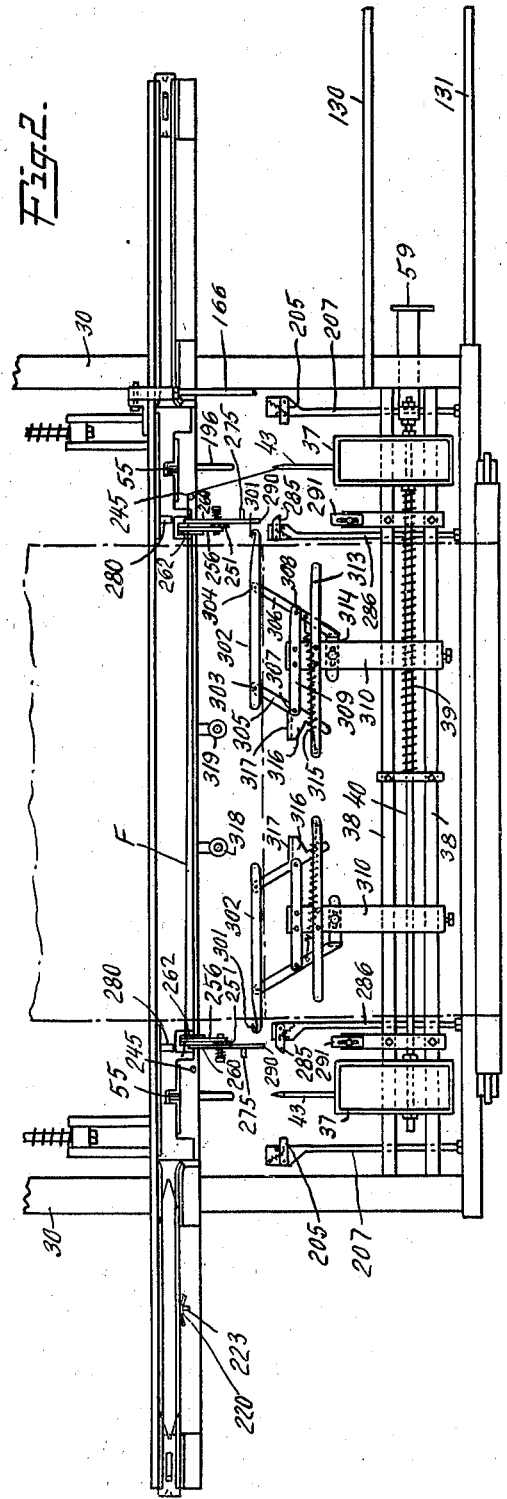
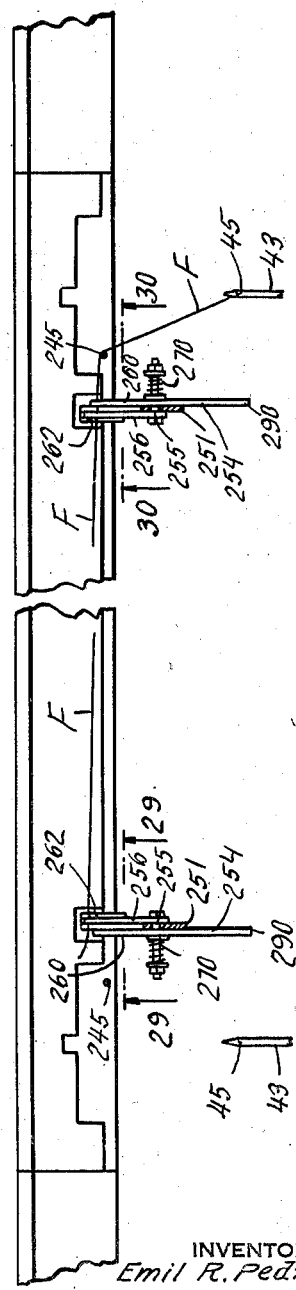
INVENTOR
Emil R. Pedrazzo
BY
Marshall & Hinkley
ATTORNEYS Aug. 8, 1939. E. R. PEDRAZZO 2,168,420
LOOM
Filed Aug. 21, 1937 10 Sheets-Sheet 3

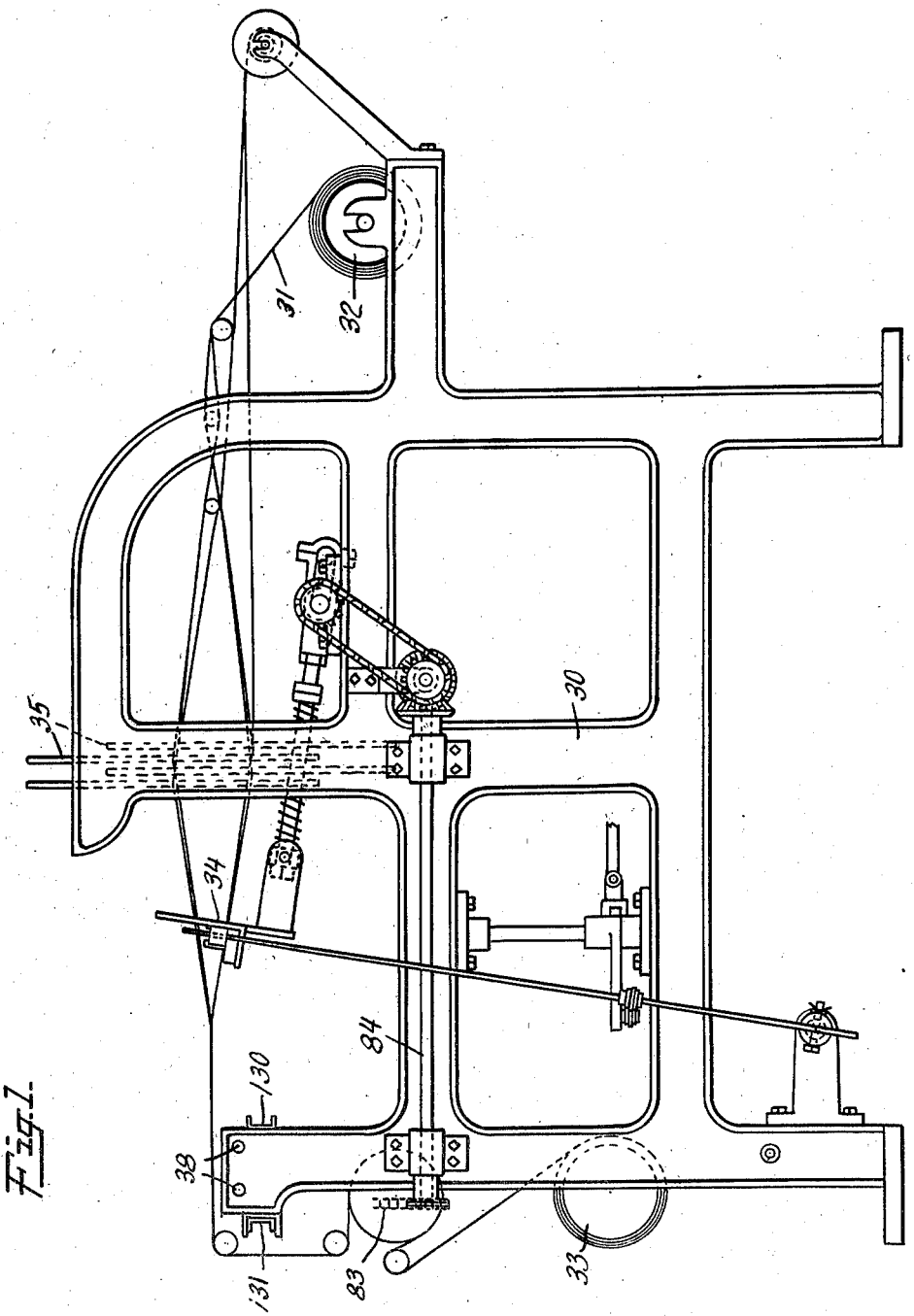

INVENTOR
Emil R. Pedrazzo
BY
Marshall & Hawley
ATTORNEYS

Aug. 8, 1939.  E. R. PEDRAZZO  2,168,420
LOOM
Filed Aug. 21, 1937  10 Sheets-Sheet 4
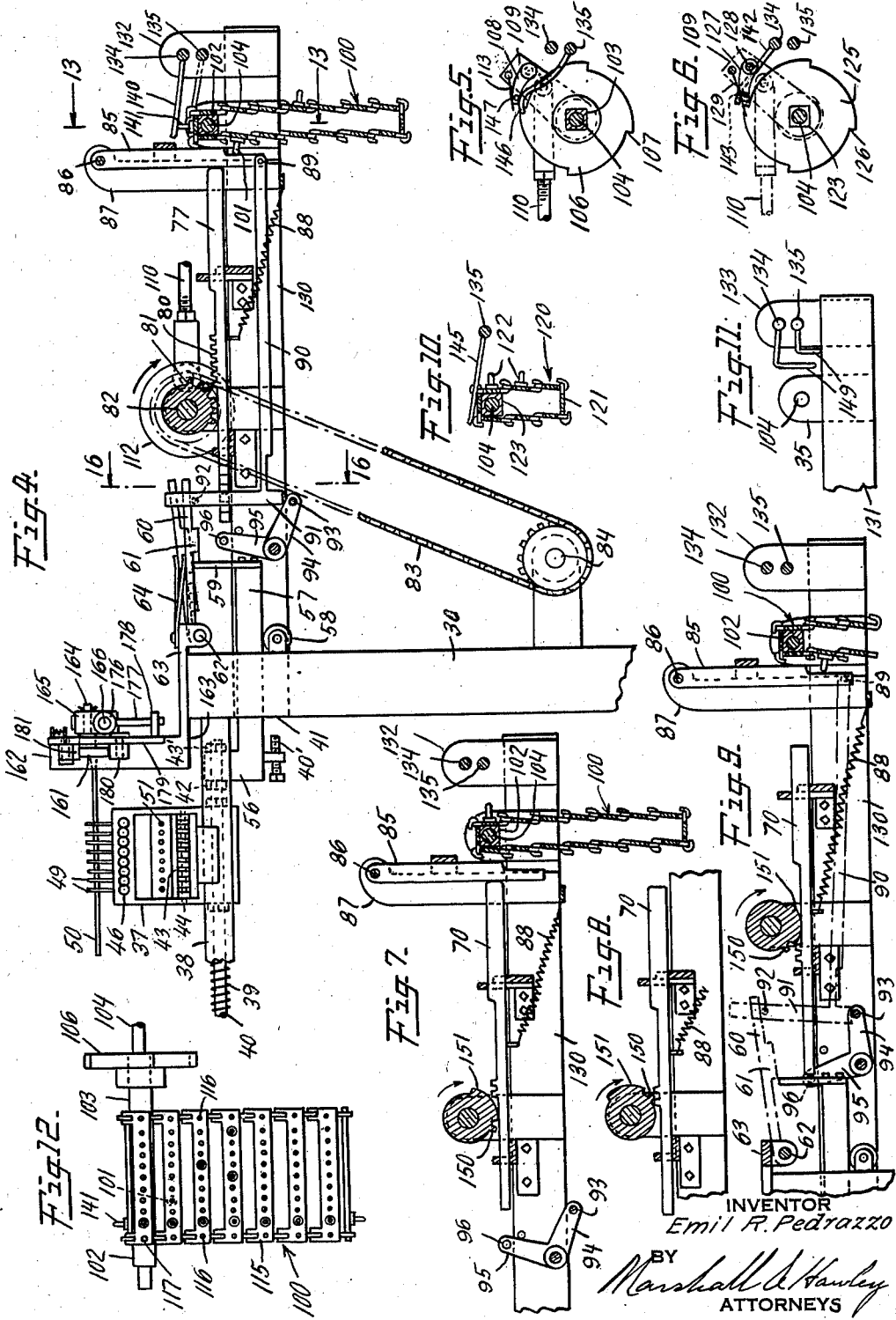
INVENTOR
Emil R. Pedrazzo
BY
Marshall A. Hawley
ATTORNEYS

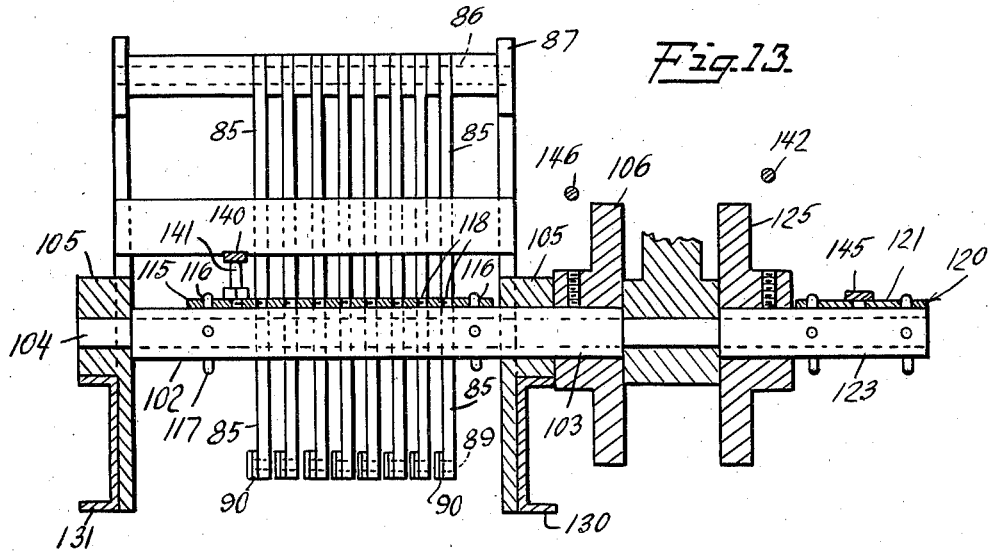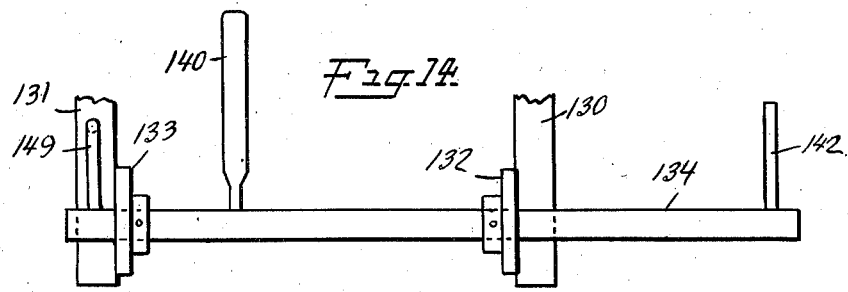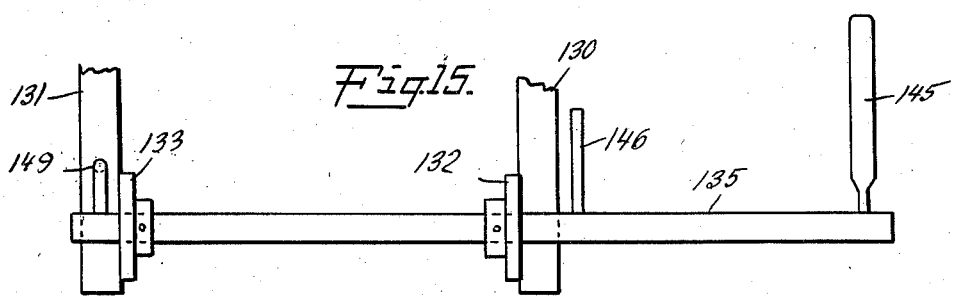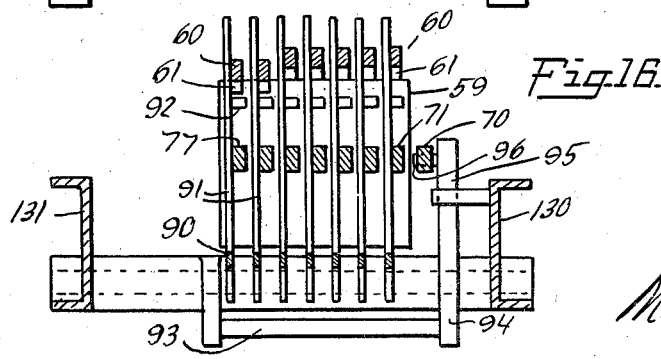

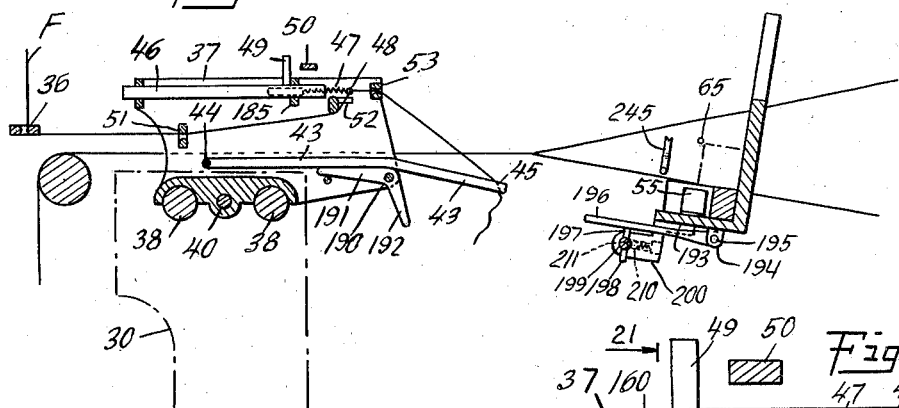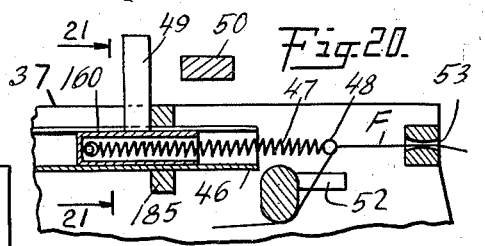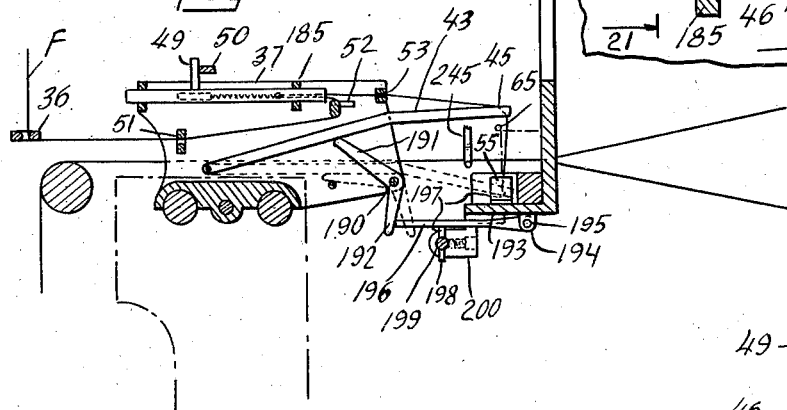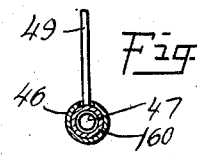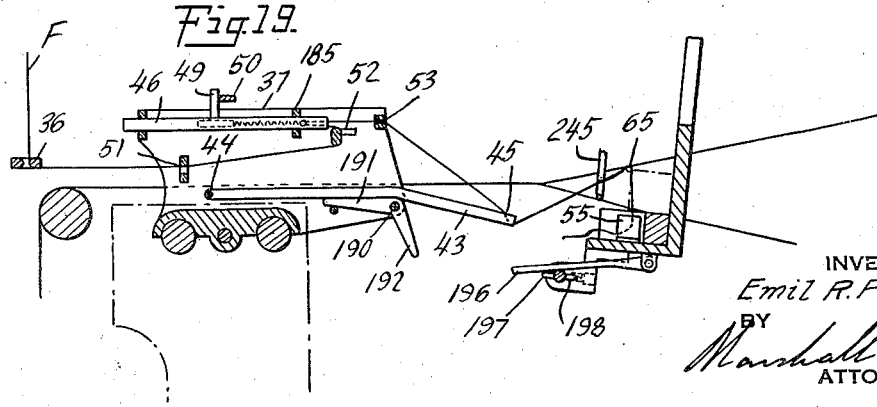

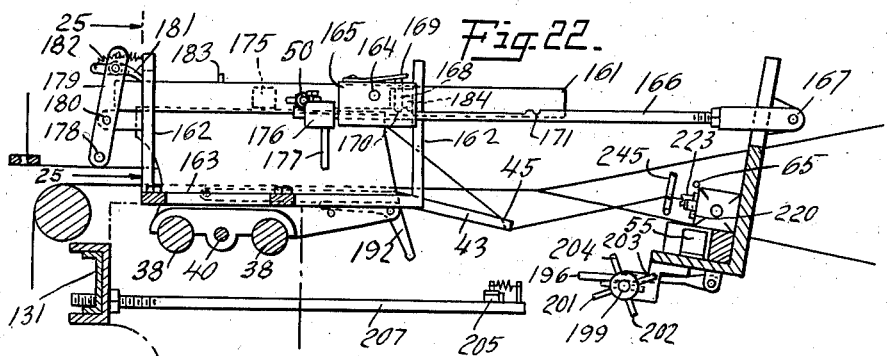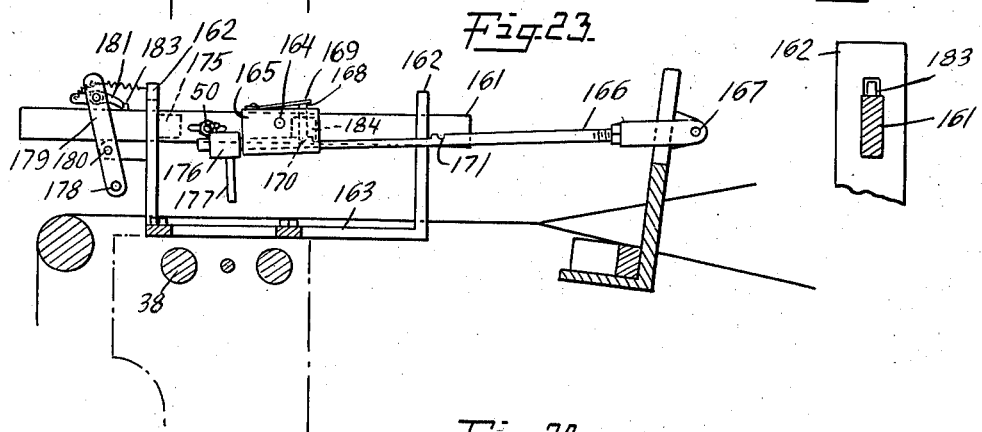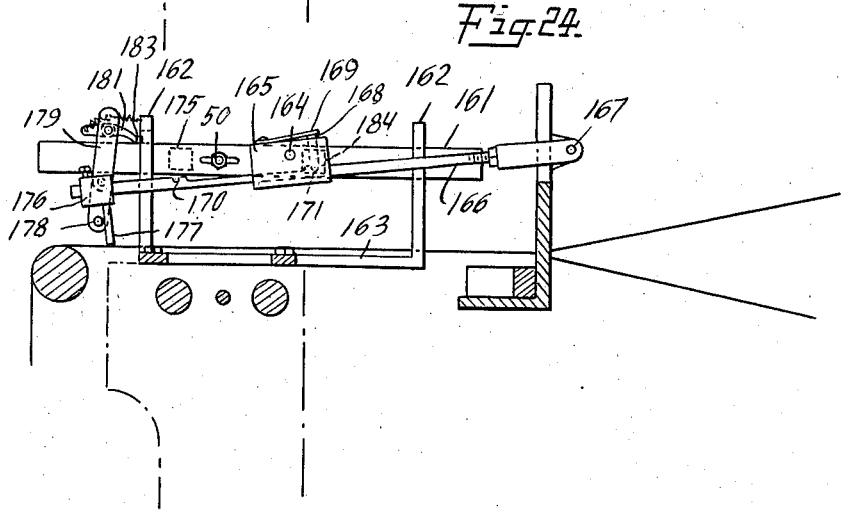

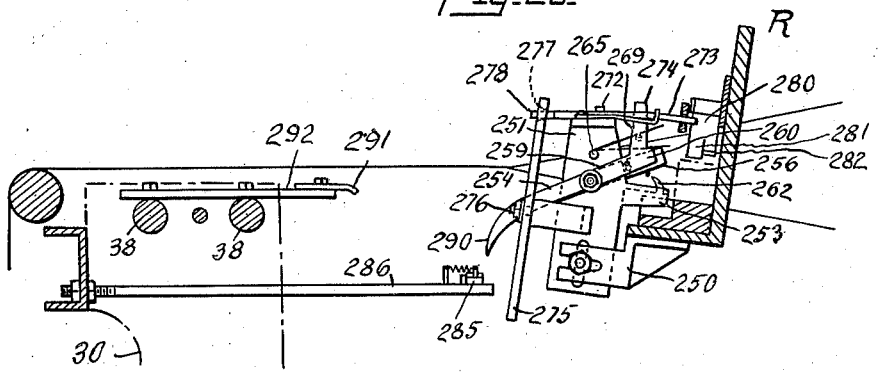
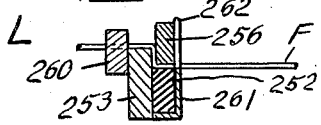
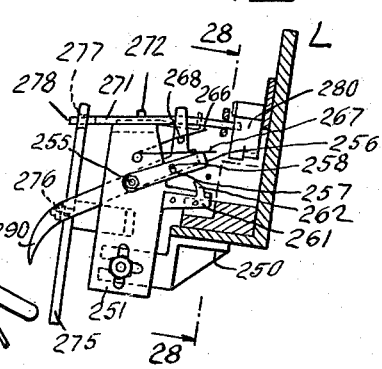
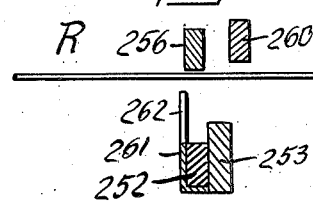
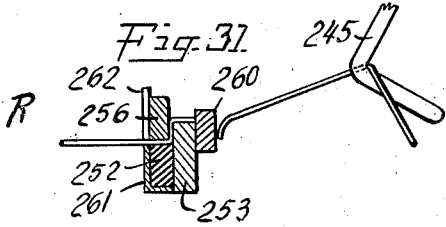
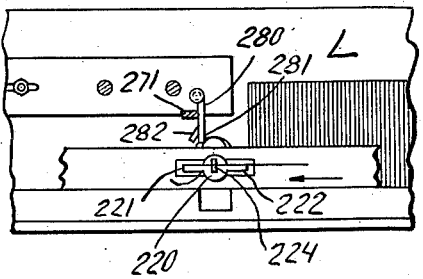

Aug. 8, 1939.  E. R. PEDRAZZO  2,168,420
LOOM
Filed Aug. 21, 1937   10 Sheets-Sheet 9
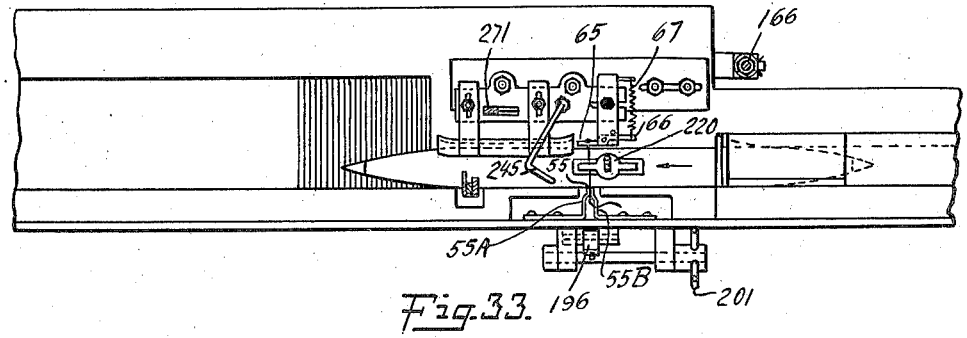
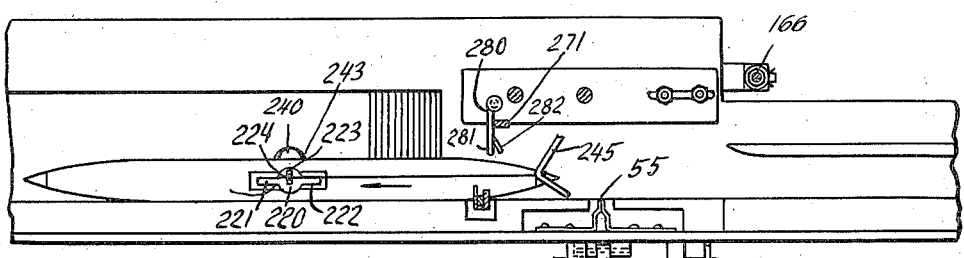
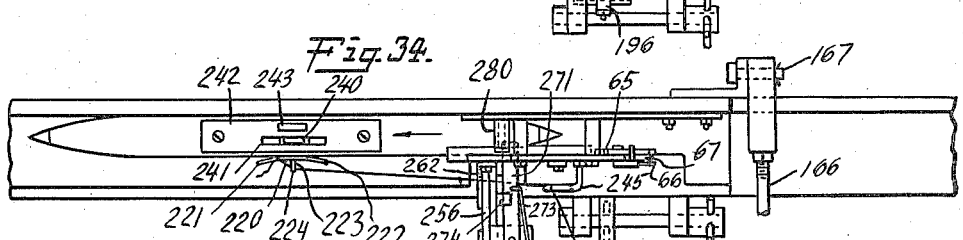
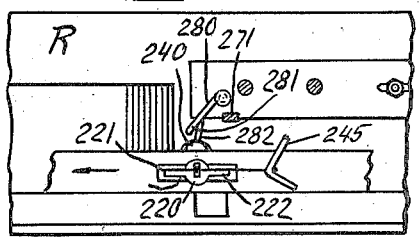
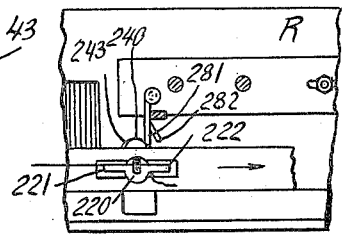
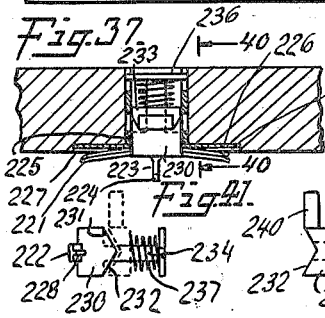
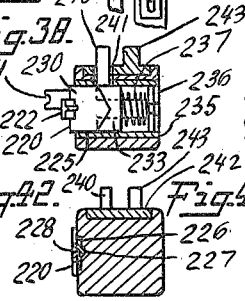
INVENTOR
Emil R. Pedrazzo
BY
Marshall C. Hawley
ATTORNEYS Aug. 8, 1939.　　　E. R. PEDRAZZO　　　2,168,420
LOOM
Filed Aug. 21, 1937　　　10 Sheets-Sheet 10
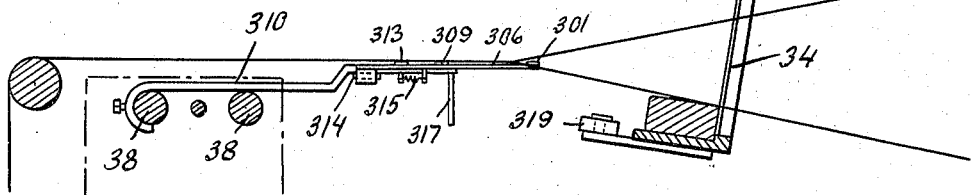
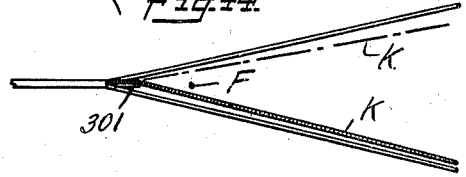
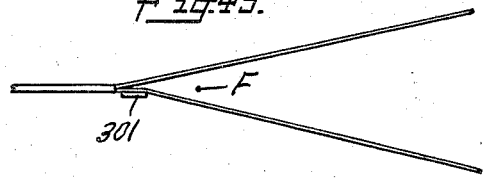
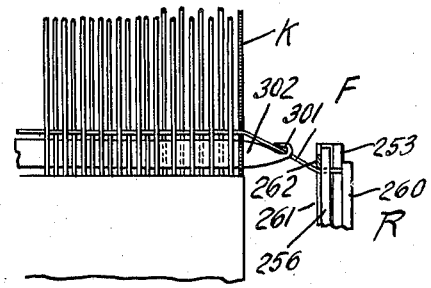
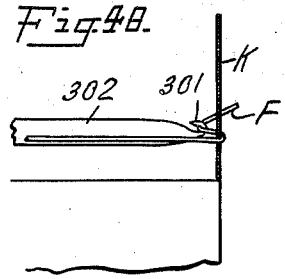
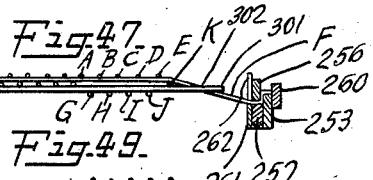
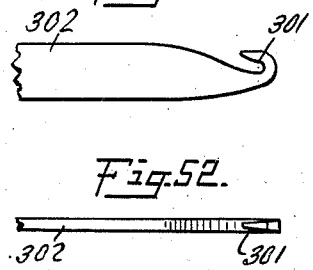
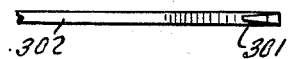
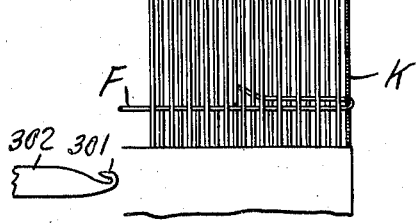
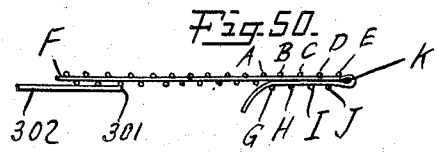
INVENTOR
Emil R. Pedrazzo
BY
Marshall & Hawley
ATTORNEYS Patented Aug. 8, 1939

2,168,420

UNITED STATES PATENT OFFICE 2,168,420

LOOM

Emil R. Pedrazzo, West New York, N. J., assignor to Magic Automatic Loom Co., New York, N. Y., a partnership composed of Charles C. Hertel, Otto C. Worf, and Emil R. Pedrazzo Application August 21, 1937, Serial No. 160,329

19 Claims. (Cl. 139—126)

This invention relates to looms.

More particularly stated, the invention relates to looms of the type in which the shuttle is pirnless or carries no bobbin. The thread for the weft or filling is carried by spools or cops arranged at the sides of the loom and the particular thread to be woven is selected and fed into the path of the shuttle which acts merely as a carrier to carry the filling across the loom or through the shed. Thus, the shuttle is operable to carry any desired or selected weft or filling thread in either direction across the loom.

The invention has for its salient object to provide a simple and practical loom of the character described so constructed and arranged that any desired weft or filling thread may be selected, fed into the path of the shuttle and carried across the loom on either stroke or pick of the shuttle.

Another object of the invention is to provide automatically operable means to clamp the filling thread at both ends of the pick and cut the filling thread to the proper length after it has been fed in one direction.

Another object of the invention is to provide a proper guiding, feeding and tensioning means so arranged that the thread will feed freely as it is being carried across the loom by the shuttle, but will be properly tensioned after it has been fed and as the reed acts to pack the filling.

Another object of the invention is to provide pattern selector mechanism for the filling or weft, so constructed and arranged that any thread selected can be repeated any desired number of picks.

Another object of the invention is to provide in a loom of the character described means for cutting each length of filling fed across the loom and means for engaging and folding back the ends of the filling to form a fast selvage at each margin of the woven piece.

Further objects of the invention will appear from the following specification taken in connection with the drawings which form a part of this application, and in which—

Fig. 1 is an end elevation, somewhat diagrammatic, showing the conventional parts of a loom on which the mechanism embodying the invention are used;

Fig. 2 is a top plan view, somewhat diagrammatic, of the front portion of the loom illustrating the general arrangement of parts constructed in accordance with the invention, the thread selector mechanism and other details being omitted;

Fig. 2A is a top plan view of the lay of the reed showing the thread clamping and cutting mechanism partly in section and in the position taken when the reed has nearly reached its extreme position of operative movement;

Fig. 3 is a top plan view of the right hand front portion of the loom illustrating the thread guiding and thread selector control mechanism and the parts related thereto;

Fig. 4 is a vertical sectional elevation, taken substantially on the line 4—4 of Fig. 3, and illustrating the thread selector mechanism;

Fig. 5 is a vertical sectional elevation taken substantially on the line 5—5 of Fig. 3 and illustrating the ratchet and pawl mechanism for controlling the feeding movement of the main pattern selector chain;

Fig. 6 is a vertical sectional elevation taken substantially on line 6—6 of Fig. 3 and illustrating the ratchet and pawl mechanism for controlling the feeding of the multiplier or repeat chain;

Fig. 7 is a vertical sectional elevation taken substantially on the line 7—7 of Fig. 3 and illustrating the release or subtractor slide bar in its position of rest;

Fig. 8 is a view similar to Fig. 7 illustrating the release slide bar being fed forwardly by the segmental gear after the finger controlling the slide bar has been selected by the selector chain;

Fig. 9 is a view similar to Fig. 7 illustrating the subtractor slide bar or release bar in its extreme forward position in which it releases all of the detent fingers with the exception of the selected finger;

Fig. 10 is a vertical sectional elevation taken through the multiplier or repeat pattern chain;

Fig. 11 is an end elevation illustrating the main selector chain and repeat chain control spindles and the limit stops mounted on the ends thereof;

Fig. 12 is a sectional elevation of the pattern control or selector chain, taken substantially on line 12—12 of Fig. 3;

Fig. 13 is an enlarged vertical sectional elevation taken substantially on line 13—13 of Fig. 3;

Fig. 14 is a top plan view of the spindle and parts carried thereby for controlling the operation of the multiplier or repeat pattern chain from the main pattern or selector chain;

Fig. 15 is a top plan view of the spindle and parts carried thereby for controlling the operation of the pattern or selector chain from the multiplier or repeat selector chain;

Fig. 16 is a vertical sectional elevation taken substantially on line 16—16 of Fig. 3;

Fig. 17 is a vertical sectional elevation taken substantially on line 17—17 through the thread control carriage and reed frame, the reed frame being shown in its rearward extreme position of movement relative to the thread guiding and positioning means;

Fig. 18 is a view similar to Fig. 17 but showing the reed frame moved forwardly to the position in which the shuttle is fed through the shed, the thread positioning finger having positioned the thread in a clamp carried by the lay and moved upwardly to hold the thread in position to be engaged by the clip on the shuttle;

Fig. 19 is a view similar to Fig. 17 but showing the finger which controls the elevation of the thread guiding finger in its power position;

Fig. 20 is an enlarged elevation partly in section, showing the thread tensioning spring;

Fig. 21 is a vertical sectional elevation taken substantially on the line 21—21 of Fig. 20;

Fig. 22 is a vertical sectional elevation taken substantially on line 22—22 of Fig. 3, illustrating more particularly the means for operating the thread tension control means, the reed frame being shown in its rear position of movement;

Fig. 23 is a view similar to Fig. 22 but showing the parts in the position taken as the reed is moving toward the front of the loom;

Fig. 24 is a view similar to Figs. 22 and 23 showing the reed in its extreme position of movement toward the front of the loom;

Fig. 25 is a vertical sectional elevation taken substantially on line 25—25 of Fig. 22;

Fig. 26 is a vertical sectional elevation through the reed frame illustrating the thread clamping and cutting mechanism, these parts being shown in the position taken at the right hand side of the loom after the thread has been fed from the right hand side to the left hand side of the loom and before the clamping and cutting means have been operated;

Fig. 27 is a vertical sectional elevation, similar to Fig. 26, but showing the corresponding parts at the left hand side of the loom prior to the operation of the clamping and cutting means;

Fig. 28 is a sectional elevation taken substantially on the line 28—28 of Fig. 27;

Fig. 29 is a sectional elevation taken through the clamping members and cutting knives at the left hand side of the loom after these parts have been operated or closed;

Fig. 30 is a sectional elevation illustrating the positions of the clamping and cutting means at the right hand side of the loom prior to their operation;

Fig. 31 is a sectional elevation, similar to Fig. 3, but showing the clamping and cutting means at the right hand end of the loom after they have been operated;

Fig. 32 is a front elevational view of the end of the lay and reed frame at the right hand side of the loom with the shuttle moving toward the left and being shown in the position taken as the thread is being clamped to the shuttle;

Fig. 33 is a view similar to Fig. 32 but showing the shuttle after it has left its thread engaging position and has started to travel across the loom toward the left;

Fig. 34 is a top plan view of the parts shown in Fig. 33;

Fig. 35 is a fragmentary elevational view showing the shuttle release and trigger release control arm in the position taken at the right hand side of the lay when the shuttle is moving beneath this arm to the left;

Fig. 36 is a view similar to Fig. 35 but showing the same parts in the position taken when the shuttle is moving to the right;

Fig. 37 is a horizontal sectional elevation through the central portion of the shuttle showing the clip for engaging the filler thread and the parts coacting therewith;

Fig. 38 is a vertical sectional elevation through the parts shown in Fig. 37;

Fig. 39 is a front elevational view of the central portion of the shuttle;

Fig. 40 is a vertical sectional elevation taken substantially on line 40—40 of Fig. 37;

Fig. 41 is an elevational view illustrating the shuttle clip for the filler thread and the release mechanism therefor;

Fig. 42 is an elevational view of the shuttle clip releasing cam;

Fig. 43 is a vertical sectional elevation, somewhat diagrammatic, through the reed frame, the selvage forming hook being shown in elevation;

Fig. 44 is a diagrammatic view of the shed of the warp selvage threads showing the selvage forming hook disposed between the selvage warp threads and beneath the outer selvage thread;

Fig. 45 is a diagrammatic view similar to Fig. 44 showing the selvage forming hook disposed below the shed of the main warp threads;

Fig. 46 is a top plan view of the right hand end of the warp, showing the selvage forming hook disposed beneath the main portion of the warp threads, between the upper and lower separated warp selvage threads, beneath the outer selvage thread, and in engagement with the clamped end of the filling thread;

Fig. 47 is a vertical sectional elevation taken at right angles to Fig. 45;

Fig. 48 illustrates the selvage forming hook pulling the end of the filling thread around the outer selvage thread;

Fig. 49 is a plan view showing the end of the filling thread in the position taken after the hook has pulled the end inwardly to form the selvage;

Fig. 50 is a sectional elevational view taken at right angles to Fig. 46;

Fig. 51 is a top plan view of one of the selvage forming hooks; and

Fig. 52 is an elevational view of the hook taken at right angles to Fig. 51.

The invention briefly described consists of a loom having mounted at the two sides of the front end thereof a plurality of spools, cones or tubes of thread to be used as the filling or weft threads, selector mechanism being provided for selecting any one of the several threads on either side of the loom. This selector mechanism determines the pattern woven and means is provided in connection therewith for multiplying or repeating any thread on either side of the loom any desired number of times.

Each thread is carried by a needle and the thread selected is fed by its needle to suitable clamping means mounted on the lay and is positioned across the path of travel of the shuttle, the shuttle having means thereon for engaging the end of the selected thread whereby the thread is fed across the loom through the shed.

After the thread has been so fed it is clamped at both ends and is cut off to the proper length to reach across the warp or width of the piece being woven.

Suitable thread guiding and tensioning means is provided, this means being so constructed and arranged that during the movement of the shuttle across the loom the thread can be freely drawn from the spool and is under normal tension. However, after the thread has been fed across the warp shed it is tensioned to a desired extent to hold the thread straight and relatively tight as it is clamped and is packed by the reed.

Means is provided for engaging the ends of the filling after the thread has been cut and folding these ends between the warp threads which form the selvage at each edge of the piece being woven, thus providing a fast selvage on the margins of the piece.

Further details of the invention will appear from the following description.

In the particular embodiment of the invention illustrated in the drawings, the loom comprises suitable side frame members 30 and the usual cross members connecting the side frame members. The warp threads 31 are mounted on roller 32 and pass through a reed 34 and heddle frames 35 of any desired construction. The woven piece is wound up on roller 33.

The heddles may be actuated in any suitable manner to open the warp and form the shed in the usual way and the reed is oscillated in the usual manner to pack the filling after the filling has been fed through the shed. Details of the parts above described have not been illustrated since they form no part of the present invention.

The filling or weft threads are wound on suitable spools, cones or tubes, not shown, and are led to the thread guiding and feeding mechanism through eyes 36. In the particular loom illustrated, eight threads of any desired variety of colors and size are mounted on each side of the loom.

*Filling thread guiding and positioning mechanism*

At each side of the loom beyond the warp threads is mounted a carriage 37 which is slidably mounted on a pair of rods 38. Each carriage is moved outwardly or away from the center of the loom by means of a spring 39 mounted on a rod 40, the limit of movement of the carriage being determined in a manner hereinafter described.

On each carriage 37 are pivotally mounted a plurality of forwardly extending fingers or needles 43 which are mounted on a pivot pin 44 and normally rest in the position shown in Fig. 17. Each of these fingers has an eye 45 at the front end thereof through which the thread is drawn. It will be noted that there are eight fingers, one for each thread at each side of the loom.

At the top of the carriage there are mounted a plurality of tubes 46, each tube having slidably mounted therein a coil spring 47 having an eye 48 at the rear end thereof through which the thread is drawn.

Each spring has secured thereto in a manner hereinafter described, an upwardly extending lug 49 which extends upwardly through a slot in the tube 46 and is engageable in the manner later described, by a bar 50.

Each filling thread F is led from the eye 36 through an eye 51 upwardly between V-shaped fingers 52, through the spring eye 48 and thence forwardly through an eye 53 and downwardly through the eye 45 at the front end of the finger 43.

The operation of the springs 47 and the engagement of the lugs 49 by the bar 50 to tension the filling at the desired time in the operation of the loom will be described later in the specification.

*Pattern selector mechanism for filling threads*

In order to select the desired thread at each end of the pick or on each stroke of the shuttle the carriage 37 is shifted laterally on the rods 38 to align the finger 43 having the desired thread with a clamp 55 which is mounted on the lay and which engages the thread as the lay and reed move forwardly.

An adjustable stop 40' on the carriage 37 is engageable with the loom frame at 41 to limit the movement of the carriage by spring 39, when the selector mechanism has not been set in operation. When in this position the thread nearest the center of the loom is aligned with the clamp 55.

The selector mechanism to be described determines the position of the carriage 37 and thus determines the alignment of the desired thread with the clamp 55. This selector mechanism is illustrated particularly in Figs. 3–16 inclusive.

The carriage 37 which is slidably mounted on the rods 38 and has connected thereto rod 40 is, as above stated, moved laterally by the action of the spring 39. The rod 40 extends through the carriage and has secured to the end thereof by nuts 42 and 43' an upwardly extending lug 56 carried by a bar 57 slidably mounted on a roller 58. The bar 57 has secured thereto and extending upwardly therefrom a stop plate 59 which is adapted to engage one of a series of downwardly projecting lugs 61 carried by a plurality of fingers 60 pivotally mounted on a fixed pivot 62 carried by a frame 63. The fingers 60 are urged in a downward direction by means of springs 64, a separate spring being provided for and engaging each of the fingers 60.

The lugs 61 are of different lengths and are differently positioned beneath the fingers 60. In order to position the carriage 37 the plate 59 is engaged by one of a plurality of slide bars 71–77 inclusive, the slide bars, as shown particularly in Fig. 3, being different lengths and therefore actuating the plate 59 different distances and feeding the carriage 37 to different extents.

Each of the slide bars 71–77 has formed on the upper edge thereof upwardly extending rack teeth 80 which are adapted to be engaged by a segmental gear 81 mounted on a shaft 82 and continuously rotated by a sprocket chain 83 driven from a shaft 84.

The rack bars 71–77 inclusive are normally positioned with the front teeth of the racks out of the path of movement of the segmental gear teeth 81. The rear ends of the rack bars engage the front surfaces of pivoted fingers 85 mounted on a fixed pivot 86 on a bracket 87. The rack bars are held in retracted position by means of springs 88.

Each of the fingers 85 has pivoted at 89 at the lower end thereof a link 90, on the opposite end of which is formed a vertically extending bar 91 having a laterally projecting lug 92 thereon, each lug 92 being positioned beneath one of the fingers 60.

The pattern or particular thread selected for the filling is determined by a pattern chain 100 and more particularly by selecting lugs 101 which are mounted on the chain in desired sequences and order to produce the pattern selected for the design.

The pattern chain is mounted on a block 102 which is intermittently rotated in a manner hereinafter described and the lugs are disposed on the chain and are staggered in the desired relation, as shown in Fig. 12.

As one of the lugs 101 engages the finger 85 in alignment therewith in the manner shown in Fig. 4, this finger will be swung on its pivot in an anticlockwise direction and will shift the slide bar in alignment therewith to the left, positioning the front teeth of the rack on this bar in the path of movement of the segmental gear 81. As the segmental gear engages the rack the rack will be fed to the left viewing Fig. 4 and the engagement of the front end of the rack with the plate 59 will feed the plate and the carriage 37 to the left, positioning the selected thread in alignment with the clamp 55 mounted on the lay.

The pattern chain 100, as above stated, is mounted on the block 102. The block 102 is extended and forms a part of a hollow shaft 103 rotatably mounted on a spindle 104 supported in brackets 105. A ratchet wheel 106 is mounted on the hollow shaft 103 and, as shown in Fig. 5, is provided with four teeth 107 engageable by a pawl 108.

As shown in Fig. 5, the pawl 108 is carried by an arm 109 pivotally mounted and oscillatable on the spindle 104. The arm 109 is driven by a link or pitman 110 which is pivoted on a pin 111 carried by a disk 112 mounted on the shaft 82. Thus, as the shaft 82 is continuously rotated, this movement will be communicated through the pitman 110 to the arm 109 which will be oscillated about the spindle 104 and will carry with it the pawl 108. A spring 113 engages the pawl and normally presses the pawl toward the ratchet wheel 106 and by engagement with the teeth 107 rotates the ratchet wheel in a step by step movement to feed the pattern chain 100.

The pattern chain is made up of a series of bar links 115, each bar link, as shown in Figs. 12 and 13, having at its ends perforations 116 which are engaged by pins 117 on the block 102.

Each bar link is also provided with a series of perforations 118, one perforation being aligned with each of the fingers 85.

When it is desired to select a thread corresponding to one of the fingers 85, a lug 101 is screwed into the opening opposite the finger which controls the particular thread and as the pattern chain is rotated the lug will engage the finger and, in the manner hereinbefore described, cause this thread to be selected by the lateral shifting of the carriage 37.

*Release or subtractor bar action*

The lower end of each of the vertical bars 91 is normally positioned above a cross rod 93 carried by a bell crank lever 94 having an upwardly projecting lever arm 95 provided at its upper end with a lug 96 positioned in the path of movement of the rear slide bar 70, which acts as a release bar, as shown particularly in Fig. 3. The release bar 70 is fed forward at every revolution of the gear 81 and acts only as a release bar and not as a selector bar. When this slide bar is actuated the bell crank lever 94, 95 is swung on its pivot and the cross rod 93 will engage beneath the lower ends of the vertical bars 91 and raise the levers or fingers 60, thus releasing the plate 59 from engagement therewith.

However, when one of the bars 71—77 inclusive has been selected in the manner above described, this bar will be fed forwardly and the finger 85 coacting therewith will be swung on its pivot to move the link 90 and the lower end of the vertical bar 91 out of the path of movement of the cross rod 93. Thus, this vertical bar 91 will not lift its finger 60, but the finger will remain in depressed position and the lug 61 depending therefrom will form a stop for the plate 59.

The action above described is a subtracting action and permits the selecting of any thread beyond the thread previously selected or, in other words, viewing Fig. 4 permits the selection of any thread at the left of the thread previously selected.

*Multiplier or repeat control mechanism*

In order to provide for multiplying or repeating the selection of any particular thread, means is provided for holding the pawl 108 out of engagement with the teeth 107 on the ratchet wheel 106, so that the thread previously selected or selected on the last pick of the shuttle will be repeated on the next pick in the same direction. This is accomplished by means of a second or multiplier selector chain 120, shown in Figs. 3 and 10. The selector chain 120 is made up of a plurality of perforated links 121 having lugs 122 similar to the lugs 101 on the chain 100.

The multiplier chain 120 is mounted on a hollow square shaft 123 rotatable on the spindle 104. This hollow shaft has also mounted thereon a ratchet wheel 125 having four teeth 126 adapted to be engaged by a pawl 127 pivoted at 128 to the arm 109. The pawl is actuated toward the ratchet wheel by a spring 129.

As the arm 109 is oscillated in the manner hereinbefore described, the pawl 127 will feed the ratchet wheel around step by step, unless the pawl is held out of engagement with the teeth of the ratchet wheel in a manner which will now be described.

The frame of the loom has secured thereto at each side thereof a pair of laterally extending frame members 130 and 131 on which the selector mechanism is mounted and secured to the outer ends of these frame members are upwardly extending lugs or brackets 132 and 133. A pair of rods or spindles 134 and 135 are rotatably mounted in the brackets 132 and 133.

The rod 134 has secured thereto a finger 140 which, as shown particularly in Figs. 4 and 13, is aligned with the openings 118 at the left hand end of the links 115 of the chain 100. When a lug 141 is inserted in one of these openings and the chain is fed, the lug will engage the finger 140 and lift the finger, thus oscillating the rod 134. The rod 134 also has secured thereto a lug 142. When the finger 140 is not engaged by a lug 141 the lug 142 will be disposed in the path of movement of a laterally projecting lug 143 carried by the pawl 127 and will hold the pawl 127 in elevated position so that as the arm 109 is oscillated the pawl will not engage one of the teeth 126 and therefore the ratchet wheel 125 will not be rotated and the multiplier chain 120 will not be fed. However, when the finger 140 is raised by reason of its engagement by the lug 141 on the selector chain 100, the lug 142 will be disposed out of the path of movement of the laterally projecting lug 143 carried by the pawl 127 and the pawl will feed ratchet wheel 125 and chain 120. In order to permit the multiplier chain 120 to continue to operate, successive lugs must be inserted in chain 100 to raise finger 140 and lug 142 to allow pawl 127 to engage ratchet wheel 125.

The rod 135 has secured thereto a finger 145 and a lug 146. The finger 145 is so disposed as to be engaged by lugs positioned in one series of openings in the links 121 of the multiplier chain. When no lug in this series of openings is fed into engagement with the finger 145, this finger will be in its depressed position, as shown in Fig. 10, and the lug 146 will be disposed in the path of movement of a laterally projecting pin 147 carried by the pawl 108 which actuates the ratchet wheel 106. Thus, when no lug engages the finger 145 the ratchet wheel 106 will not be rotated upon the oscillation of the arm 109 and the selector chain 100 will not be fed. Since the selector chain will not be fed the thread previously or last selected will be repeated on the next pick or throw of the shuttle.

After the multiplier has operated in the manner just described to repeat a thread in the pattern and it is desired to change on the next pick to another thread, a lug 122 is inserted in the multiplier chain in position to engage the finger 145. The finger will therefore be elevated oscillating the rod 135 and lug 146 carried thereby, thus moving the lug 146 out of the path of movement of the pin 147 carried by the pawl 108. The next throw of the arm 109 will thereupon rotate the ratchet wheel 106 and move the lug in the selector chain which has engaged the finger 85 to select the last used thread away from said finger. However, in order to then select another thread the lug 145 must be maintained in elevated position for otherwise the ratchet wheel 106 would not be rotated to bring another lug in the selector chain 100 into engagement with a finger 85 to set in motion the selecting mechanism to select another thread. Therefore, after each multiplier or repeat action, during which the selector chain 100 has remained stationary, two lugs 122 must be inserted in the multiplier chain 120 in the line of openings disposed in alignment with the finger 145. The rods 134 and 135 have secured thereto at one end stop lugs 149 which engage the frame 130 to limit the movement of the rods in one direction.

As hereinbefore explained, each of the slide bars 70-77 inclusive has rack teeth 80 on the upper surface thereof, these racks being of equal length on the slide bars 71—77. These slide bars, however, are graduated in length so that by their engagement with the plate 59 carried by the bar 57 the plate bar and carriage 37 will be fed variable distances depending on the particular slide bar selected by the selector mechanism above described. However, the slide bar 70 has only two teeth in the rack formed thereon and the end of the segmental gear 81 disposed in alignment with the slide bar 70 is provided with one tooth 150 and with an arcuate cam surface 151.

The slide bar 70, as hereinbefore explained, is aligned with a lug 96 carried by the bell crank lever comprising arms 94 and 95. This bell crank lever, as previously set forth, carries at its lower end a rod 93 adapted to engage the lower ends of the vertical bars 91 carried by the links 90.

The lugs 61 carried by the fingers 60 are graduated in length from the front to the back viewing Fig. 3. When it is desired to select a thread controlled by the finger 60 having a shorter lug 61 than the lug on the finger controlling the thread last selected, the selector chain 100 has inserted therein a lug in alignment with the finger 85 controlling the slide bar 70. This will cause the slide bar 70 to move from the position shown in Fig. 7 to the position shown in Fig. 8, in which latter position the tooth 150 is moving between the two teeth on the bar 70, feeding the bar to the left to a sufficient extent to operate the bell crank lever 94, 95 and lift the vertical bars 91 corresponding to all of the fingers 85, except the finger 85 which controls the next pick. This particular finger having been moved to the left viewing Fig. 4, its bar 91 which is connected thereto by the link 90 will be moved out of the path of movement of the rod 93. Therefore, the finger 60 corresponding to the finger 85 selected will remain down and as the other fingers 60 are raised the plate 59 will shift to the right under the action of the spring 39 until the plate engages the lug 61 on the selected finger 60. In order to insure the action just described the releasing slide bar 70 will be held in its forward position during the engagement of the arcuate cam portion 151 with the rear tooth on the slide bar, thus maintaining all of the fingers 60 in elevated position, except the selected finger.

*Summary of operation of selector mechanism*

From the foregoing description it will be seen that during the operation of the loom the selector chain 100 will be rotated step by step to bring the lugs 101 which have been inserted in the chain to produce the desired pattern, into engagement with the fingers 85. As the lugs engage the fingers they will be swung on the pivot 86, thus actuating the slide bars 71-77 inclusive and bringing the bars into such position that they will be engaged by the segmental gear and will be fed to the left viewing Fig. 4. Since these bars are of different lengths, by their engagement with the plate 59, the carriage 37 will be moved varying increments or distances to position the selected thread in alignment with the clamp 55. The carriage will be held in this position by engagement of the lug 61 on the selected finger 60 with the plate 59 after the plate has been fed by the slide bar.

As has been explained, a selected thread can be repeated on the next pick in the same direction by the action of the multiplier chain 120, the multiplying action taking place when no lug on the chain 120 is disposed in engagement with the finger 145.

Moreover, the multiplier chain can be held out of operation when a lug on the pattern chain 100 is disposed in engagement with the finger 140, thus causing the lug 142 to hold the pawl 127 out of engagement with the ratchet wheel 125.

*Thread tensioning control means*

This mechanism is illustrated particularly in Figs. 3 and 17-25 inclusive. As hereinbefore described, the weft or filler threads are led through eyes 36 and 51 between forked fingers 52 and through a loop 48 at the front end of the spring 47. The springs 47 are slidably mounted in tubes 46 and, as shown particularly in Fig. 20, the rear ends of the springs are secured in cylinders 160 which are slidably mounted in the tubes 46. The upwardly extending lugs 49, hereinbefore described, are secured to the cylinders 160.

During the feeding of the filler across the shed the thread is free to feed and is not under any tension. However, after the filler has been fed across the loom and is clamped at the other side of the loom, the filler is tensioned in the manner about to be described in order to hold the filler straight and relatively tight as the filler is clamped and cut before the reed packs the filler against the woven fabric. This is accomplished in the following manner:

The bar 50 which engages the lugs 49 is carried by a bar or rod 161 slidably mounted in brackets 162 which extend upwardly from the base 163. The bar 161 has extending laterally therefrom a pin 164 on which is mounted a box 165 which is slidably mounted on a rod 166, the rear end of which is pivotally secured at 167 to the reed frame.

The box 165 has a slidably mounted dog 168 therein which is pressed downwardly by a spring 169. The dog 168 is adapted to engage one of a pair of notches 170 or 171 and when the dog engages one of these notches the movement of the rod with the reed will cause the bar 161 to slide in the brackets 162. As the bar 161 is reciprocated the cross bar 50 will be also moved. In Fig. 22 the lay or reed is shown at its extreme rear position, in which position the shuttle moves across the loom through the shed. In this position the dog 168 is positioned in the notch 170. From the showing in Fig. 23 it will be seen that the reed has started to move forward and has carried with it the box 165, bar 161 and cross bar 50. In this view the bar 161 is shown at its forward limit of movement since a stop lug 175 carried by the bar 161 has engaged the bracket 162. However, the reed has not reached its limit of movement and upon further forward movement of the reed and the rod 166 the dog 168 is released from the notch 170 and the rod 166 moves forwardly through the box.

On its forward end the rod 166 has secured thereto a sleeve 176 from which depends a lug 177. The lug 177, as the rod 166 moves forwardly, engages a pin or stud 178 disposed at the lower end of the lever 179 pivoted intermediate its ends upon a fixed pivot 180. The upper end of the lug 179 has pivoted thereon a pawl 181 which is actuated in a downward direction by a spring 182. When the bar 161 is in its forward position of movement, as shown in Fig. 23, the pawl 181 is disposed in engagement with a lug 183 which extends upwardly from the bar 161. Upon the engagement of the lug 177 with the pin 178 the lever 179 is swung in a clockwise direction and by reason of the engagement of the pawl 181 with the lug 183 the bar 161 will be fed rearwardly from the position shown in Fig. 23 to the position shown in Fig. 24, in which latter position the dog 168 engages the notch 171 in the rod 166.

As the rod 166 moves rearwardly again, the bar 161 and bar 50 will move with the rod until a rear stop 184 engages the bracket 162. The rearward movement of the springs is limited by the engagement of lugs 49 with a fixed cross bar 185. Thereupon, the dog will ride out of the notch 171 and the bar 161 will not be fed again until the rod 166 moves forwardly again to engage the dog with the notch 170.

As the filler is fed across the lay by the shuttle the thread moves freely and is under no tension. However, after the filler has been fed to the opposite side of the loom and the free end thereof is clamped in a manner hereinafter described, the reed moves forwardly to pack the filler and during this movement, by the mechanism just described, the bar 50 is moved and by its engagement with the lugs 49 stretches the spring 47 through which the thread is being drawn. This tension, however, is not communicated beyond the spring fingers 52 which grip the thread sufficiently to prevent the tension from being communicated to the portion of the thread from the spool or tube to the fingers. After the thread has been tensioned in the manner described it is clamped and cut at the right hand side of the loom, assuming the shuttle to have moved to the left.

*Thread positioning mechanism*

This mechanism is particularly illustrated in Figs. 3 and 17 to 22 inclusive. As hereinbefore explained, when the carriage 37 is moved laterally to selected position and the reed is actuated toward the front of the loom the carriage will be so positioned that the selected thread and the selected finger 43 which carries the thread will be disposed in alignment with the clip or clamp 55 carried by the lay of the reed frame.

As shown in Fig. 18 the selected finger 43 has entered the clamp 55 between the upwardly projecting clamping fingers 55A and 55B and has been moved to elevated position. This is accomplished in the following manner:

Beneath each of the fingers 43 there is disposed a bell crank lever mounted on a fixed pivot 190 on the carriage frame 37. Each bell crank lever comprises a pair of arms 191 and 192, the arm 191 being disposed beneath the horizontal portion of the finger 43.

The lay or base 193 of the reed frame has projecting downwardly therefrom lugs 194 in which is mounted a pivot pin 195. On the pin 195 is mounted a finger 196. The position of the finger 196 is controlled by oppositely extending pins 197 and 198 mounted on a spindle 199, rotatably supported in lugs 200.

The position of rotation of the spindle 199 is controlled by pins 201, 202, 203 and 204, carried by the end of the spindle 199 and disposed 90° apart around the axis of the spindle. The spindle 199 is intermittently rotated or rotated step by step through 90° of movement for each movement of the reed and reed frame to pack the filling. This is accomplished by engagement of one of the pins 201—204 by a dog 205 pivotally mounted at 206 to a member 207 fixed to the front frame of the loom. The dog 205 is normally urged in a clockwise direction against a stop 208 by a spring 209.

As the reed frame moves to the left viewing Fig. 22, or toward the front of the machine, one of the pins 201—204 will engage the dog 205 and will swing the dog on its pivot. On the return movement of the reed frame the dog 205 will engage one of the pins 201—204 and the spindle 199 will be rotated 90°. However, since the pins 197 and 198 are disposed 180° apart, the spindle 199 will be disposed in the position shown in Fig. 18 only twice in each revolution of the spindle or after every second 90° rotation of the spindle. The reason for this is that the shuttle is moved from left to right through the shed and is then moved from right to left. Therefore, the selected thread, for instance, on the right hand side of the loom, is engaged by the shuttle every other pick.

When the pin 197, shown in Fig. 17, has elevated the finger 196 from the position shown in Fig. 19 to the position shown in Fig. 18, the end of the finger 196 will engage the arm 192 of the bell crank lever and swing this lever on its pivot from the position shown in Fig. 17 to the position shown in Fig. 18. This movement of the bell crank lever will elevate the front end of the selected thread carrying finger 43 to the position shown in Fig. 18, during which movement the finger 143 moves upwardly between the clamping fingers 55A and 55B, leaving the end of the selected thread clamped between these fingers 55A and 55B. When the thread is so disposed it is in position to be engaged by the clip on the shuttle and to be fed across the loom.

Any suitable means may be provided to form a non-positive stop to hold the spindle 199 in each of its 90° positions of movement. This means may consist of a spring pressed lug 210 engageable with one of a series of depressions 211 in the spindle 199.

Shuttle or thread carrier

This mechanism is particularly illustrated in Figs. 32 to 43 inclusive. The shuttle or thread carrier used in this loom is not a shuttle in the ordinary sense, since it is pirnless or carries no thread supplying quills or cops. The shuttle merely acts as a carrier for the thread and is provided on its forward face with a clip 220 having oppositely facing fingers 221 and 222. Intermediate the fingers 221 and 222 there is disposed an outwardly extending lug 223, having a notch or fork 224 at its outer end. The clip 220 is slidably mounted and extends through a central opening 225 in a plate 226 mounted on the front face of the shuttle. The plate 226 is provided with a longitudinal groove 227 and the clip fingers 221 and 222 have formed thereon longitudinal centrally disposed ribs 228 which seat in the groove 227.

The central body portion 230 of the clip 220 is slidably mounted and is provided with a V-shaped inner surface 231 which engages a V-shaped notch 232 in a cam 233, rotatably mounted on a spindle 234 projecting rearwardly from and secured to the body portion 230 of the clip. These parts are all mounted in a sleeve 235 which extends through the shuttle or thread carrier.

A head 236 is mounted on the rear end of the spindle 234 and a spring 237 surrounds the spindle 234 and is positioned between the head 236 and the rear face of the cam 233.

A lug 240 is secured to the cam 233 and extends upwardly through the upper surface of the shuttle and through a slot 241 formed in a plate 242 secured to the upper surface of the shuttle. The plate 242 has formed thereon, in alignment with the lug 240, a fixed upwardly projecting lug 243.

During the normal operation of the shuttle the clip fingers 221 and 222 are seated against the plate 226. Thus, as the shuttle reaches the position shown in Fig. 32 on the right hand end of the loom the clip 220 engages the vertically extending portion of the selected thread and the end of the thread is clamped to the shuttle, as shown in Figs. 32 and 37.

As the shuttle moves toward the left viewing Fig. 32, the portion of the selected thread extending toward the front of the loom or between the thread carrier and the reed is positioned in a V-shaped hook 245 which is secured to and projects forwardly from the reed frame.

As the end of the selected thread has been clipped to the shuttle and the thread is guided into the V of the hook 245, the thread will be positioned in the notch 224 on the outer end of the lug 223 which projects outwardly from the shuttle. This is clearly illustrated in Figs. 33 and 34.

The operations just described may be briefly summarized as follows:

After the particular thread desired for the pick has been selected and the reed moves forwardly toward the front of the loom the selected finger 43 will be positioned between the fingers 55A and 55B of the clamp 55 and the bell crank lever arm 192 will be engaged by the elevated finger 196 and the thread will be drawn upwardly, the free end thereof being held between the clamping fingers 55A and 55B.

As the filling thread is drawn upwardly it is positioned behind a pivoted pin 65 mounted on the reed frame and having a tail 66 held against a stop 67 by a spring 68. This is illustrated particularly in Fig. 32.

As the shuttle is thrown across the lay from the right to the left hand side of the loom, the clip 221 will engage the vertical portion of the thread and clamp the thread to the shuttle. As the shuttle moves forwardly across the loom to the position shown in Fig. 33, the selected thread will be guided into the V of the hook 245 and will be positioned in the notch 224 of the lug 223 carried by the shuttle.

Thread clamping and cutting mechanism

This mechanism is illustrated particularly in Figs. 2, 2A, 3, 26–31 and 34.

The mechanism heretofore described in the specification has been described more particularly with reference to the parts shown at the right hand side of the loom. However, it should be understood that this mechanism is duplicated on the opposite side of the loom and that the two mechanisms operate alternately on successive picks. For convenience in describing the operation of the thread clamping and cutting mechanism the parts shown on the right hand side of the loom will be indicated by the letter "R" and those on the left hand side of the loom will be designated by the letter "L".

After the filling thread has been fed across the loom by the shuttle or thread carrier the end of the thread carried by the shuttle is clamped and the projecting end of the thread between the thread carrying finger and the reed is clamped and cut. The mechanism for accomplishing this and the successive steps in the operation described are shown in detail in Figs. 26–31 inclusive.

At each end of the lay there is mounted a bracket 250, to which is secured a member 251 on which is mounted the clamping and cutting mechanism. The member 251 has formed thereon a fixed clamping jaw 252 and a fixed knife or cutter blade 253. A lever 254 is pivoted at 255 to the member 251 and has formed on its rear end a movable clamping member 256. The arm forming the movable clamping member 256 has formed therein a slot 257 in which is positioned a pin 258 which projects laterally from an arm 259, the rear end of which forms the movable cutting blade 260. Attention is directed to the fact that the movable cutting blade 260 is not as long as the movable clamping blade 256. This is clearly illustrated in Fig. 27.

Adjacent the fixed clamping member 252 and cutting blade 253 there is positioned a lug or member 261 having formed thereon and projecting upwardly therefrom a finger 262.

From the showing in Figs. 2 and 2A it will be noted that the filling thread extends across the loom at an angle to the reed frame, the end of the thread at the left being disposed closer toward the reed frame than the portion of the thread at the right of the loom. From the illustration in Fig. 27 which shows the parts at the left side of the loom, it will be seen that the thread, the position of which is indicated by a black dot, is disposed on the right hand side of the finger 263. Therefore, upon the closing of the clamping and cutting mechanism the thread will be clamped between the jaws 252 and 256, but will not be disposed between the cutting knives 253 and 260. The thread will, therefore, be clamped at the left hand side of the loom, but will not be cut.

However, from the illustration in Fig. 26, which shows the parts at the right side of the loom, it will be noted that the thread is disposed at the left of the finger 262, in which position it will be clamped and then cut.

The clamping and cutting mechanism is operated in the following manner:

The frame or member 251 has secured thereto a pin or stud 265 to which are secured spring leaves 266 and 267. The spring 266 presses downwardly on a pin 268 carried by an upwardly projecting arm 269 which is formed on and extends upwardly from the movable cutter blade 260.

The spring leaf 267 engages and presses downwardly on the end of the movable clamping member 256.

The movable cutting blade 260 is pressed into shearing relation with the blade 253 by a spring 270 which is mounted on the pivot pin 255. This is shown particularly in Fig. 2A.

The cutting and clamping mechanisms are normally held in inoperative position, as shown in Figs. 26 and 27, by means of a trigger consisting of a lever 271 pivoted at 272 and spring actuated toward the arm 269 by a spring 273. The trigger or lever 271 is engaged by a hook 274 on the upper end of the arm 269 and thus holds the movable clamping and cutting members in elevated position.

The trigger or lever 271 is controlled by a lever 275 which is mounted on a fixed pivot 276 and has an eye 277 at its upper end receiving a forwardly projecting end 278 of the trigger lever 271.

The trigger lever 271 is also controlled at its opposite end by a pivoted arm 280 mounted on the reed frame and having on its lower end a pair of dogs 281 and 282. The dog 281 is adapted to be engaged by the upwardly extending lug 240 of the shuttle cam 232, shown particularly in Figs. 28, 38 and 41. As the lug 240 moves to the left with the shuttle it will engage the dog 281 on the arm 280, shown in Fig. 28, and will swing the arm in a clockwise direction, thus swinging the trigger lever 271 on its pivot 272 and releasing the clamping and cutting mechanism, at the left hand side of the loom.

The lug 243 is fixed and the lug 240 operates the cam release for the thread clip 221, 222. When the shuttle leaves the box then the dog 281 engages the fixed lug 243 and swings the pivoted arm 280 aside so that no engagement of the dog 282 with the lug 240 will be effected. However, when the shuttle has traversed the lay then the dog 282 will engage the lug 240 and through the action of the cam release the thread from the clip 220, 221. The dogs 281 and 282 are displaced laterally from each other on the lower end of the pivoted arm 280 and are respectively alined with the dogs 240 and 243.

The oscillation of the cam 232 by the engagement of the dog 281 with the lug 240 will force the clip outwardly, releasing the thread from between the clip finger 221 and the plate 226. This release of the clamping and cutting mechanism will clamp the thread between the clamping members 252 and 256. However, the thread will not be cut since the movable cutting blade 260 is not long enough to engage the thread.

This clamping operation, at the left hand side of the loom takes place in advance of the clamping and cutting operation at the right hand side of the loom. These operations are so timed in order that the thread may be tensioned after it is clamped on the left hand side of the loom and before it is clamped and cut on the right hand side of the loom.

The clamping and cutting mechanism at the right hand end of the loom is tripped by means of a dog 285, shown particularly in Fig. 3, and disposed in the path of movement of the lower end of the lever 275. The dog 285 is mounted on a bar 286 fixed to the front of the loom and is normally held by a spring 287 against a stop 288. After the thread has been clamped on the left hand end of the loom in the manner shown in Fig. 29, and the bar 50 has been moved rearwardly in a manner hereinbefore described to tension the spring 47 and the selected thread, the lever 275 at the right hand side of the loom will engage the dog 285 and will be swung on a pivot 276, thus swinging the trigger lever 271 and releasing the clamping and cutting mechanism. Due to the pin and slot connection between the movable cutting knife and movable clamp the clamp closes before the thread is cut. At this side of the loom, as shown in Fig. 26, the thread is positioned between the knife blades 253 and 260 as well as between the clamp members 252 and 256. Thus, as shown in Fig. 31, the thread will be clamped and cut.

When the reed approaches its limit of movement toward the front of the loom, the clamping and cutting mechanism at each side of the loom will be reset by the engagement of the tail 290 of the lever 254 with an adjustable lug 291 carried by an arm 292 fixed to the frame of the loom. As the lever or arm 254 is swung in the anti-clockwise direction viewing Fig. 27, the movable clamping member and movable cutting blade will be raised whereupon the arm 269 will be engaged in the notch 274 of the trigger lever 271 and the parts will be held in open position.

Selvage forming mechanism

For the construction and operation of this mechanism attention is directed particularly to Figs. 2, and 43-52 inclusive.

At each longitudinal edge of the warp are located the selvage warp threads, ten threads being used for this purpose, although as many as desired may be used.

As the filling thread is clamped at the two sides of the loom the heddles controlling the selvage warp threads are operated to separate ten selvage threads in the manner shown in Fig. 44. The filling thread is carried over the top of the outer selvage thread shown at K in Figs. 44-50 inclusive.

At the two sides of the loom, as shown in Fig. 2, there are disposed hooks 301, the hooks being formed on the outer ends of bars 302. The bars 302 are pivotally connected at 303 and 304 to links 305 and 306. These links are pivoted at 307 and 308 to the outer ends of the bars 309 which are mounted on brackets 310 secured to cross frame members 38 at the front of the loom, the brackets 310 extending across and resting on the cross frame members.

The front ends of the links 305 and 306 are positioned beneath bars 313 and the ends of the link 306 seat against abutment members 314 adjustably mounted on the bracket 310. Springs 315 retain the links, bars and hooks in the position shown in Fig. 2, each spring being fixed at one end to one end of the stationary bar 313 and being connected at its other end to the link 306 in front of its pivot 308.

Each link 305 has secured to the inner end thereof a plate 316 having a downwardly extending flange 317.

The hooks and the linkage which controls the operation thereof are actuated by rollers 318 and 319 which are carried by the reed frame base and are positioned in alignment with the downwardly extending flanges 317. As the reed frame moves toward the front of the loom and approaches the position taken when the filling thread has been tensioned, cut and is clamped at the two sides of the loom, the rollers 318 and 319 will engage the flanges 317 and swing the links 305 and 306, drawing the hooks 301 inwardly.

Fig. 44 shows the selvage warp threads separated, with the filling thread F disposed between the upper and lower selvage threads and above the outer selvage thread K. The hook 301 is disposed between the upper and lower selvage thread and below the outer selvage thread K and in engagement with the filling thread F. In Fig. 45 the main warp threads are shown as separated with the filling thread F therebetween and the hook is beneath the lower warp threads.

It will be noted from the showing in Fig. 46, that the hook 301 at the right hand side of the loom is disposed between the marginal or selvage warp threads A, B, C, D and E, and the threads G, H, I and J. The outer thread K is disposed beneath the filling thread F and above the hook bar 302. When the parts are in the position shown in Fig. 46, the cutter at the right hand side of the loom is in a position to cut the thread and the two clamps are about to release the ends of the filling beyond the edges of the warp. As soon as the thread is cut at the right hand side of the loom and is released by the two clamps, the rollers 318 and 319 engage the flanges 317 and swing the links 305 and 306 on their pivots, thus drawing the hooks inwardly and pulling the ends of the filler thread around the outer warp threads K, and between the upper and lower sets of selvage warp threads. The ends of the filler, when released or pulled through the hooks, are disposed in the position shown in Figs. 49 and 50. During the inward movement of the hooks these members move slightly on an arc and rearwardly about the pivots of the links 304 and 305.

It will thus be seen that after the filling has been fed through the shed, has been clamped at its free end and clamped and cut at the other side of the loom, the ends of the filler will be engaged prior to their release from the clamp by the hooks 301 and will be drawn inwardly in the manner illustrated between the two sets of warp selvage threads to form the selvage. After the ends of the filling thread F have been drawn in to form the selvage and the filling has been packed by the reed, the reed moves rearwardly, and as the rollers 318, 319 move away from engagement with the flanges 317, the hooks will be again projected outwardly to the position shown in Fig. 2.

*Summary of operation of the loom*

Since the operation of the various mechanisms have been outlined after the description of the mechanisms, a detailed summary of operation is not necessary. The operation may, however, be briefly summarized as follows:

In the first place, the particular filling thread desired at each side of the loom is selected by the operation of the pattern chain 100 and any filling threads selected can be repeated on the next pick or picks in the same direction by the operation of the repeating or multiplier chain 120.

After the filling thread has been so selected the reed moves toward the front of the loom and the thread which extends through the finger 43 which is aligned with the clamp 55 will be positioned in the clamp as the finger is elevated in the manner shown in Fig. 18. The vertical portion of the thread will then be positioned in the path of movement of the clip 220 and will be engaged by one of the clip fingers 221 or 222. The shuttle will then continue through the shed across the loom and will draw the thread through the V in the hook 245 and through the notch 224 in the lug 223. When the shuttle reaches the other side of the loom the lug 240 will engage the pivoted arm 280 and trip the latch 271 which holds the cutter and clamp on the left hand side of the loom in elevated position. Moreover, as the lug 240 engages the pivoted arm 280 the cam 232 will release the end of the thread from the clip. At the left hand side of the loom the thread is disposed in the position shown in Fig. 27, or out of the path of movement of the cutting blade 260.

At the right hand side of the loom the cutter and clamp will be released by the engagement of the dog 285 with the pivoted lever 275 which oscillates the trip lever 271 and releases the cutter and clamp. These parts will then take the position shown in Fig. 31.

While the ends of the filling thread F are still held in the clamps at the two ends of the loom, the hook 301 will operate in the manner described and will engage the ends of the filling thread and, as they are released from the clamps, will pull the released ends between the upper and lower sets of selvage thread and around the outer selvage threads K.

From the foregoing specification it will be clear that the loom described possesses many advantages over the looms now on the market and in general use. The use of quills and cops and the necessity of winding the yarn thereon is eliminated and a single pirnless shuttle is used.

Any desired number of threads of a variety of colors may be used and any particular thread desired may be selected and may be repeated for any number of picks.

A fast selvage will be formed at each edge of the piece woven.

Although one specific embodiment of the invention has been particularly shown and described, it will be understood that the invention is capable of modifications and that changes in the construction and in the arrangement of the various cooperating parts may be made without departing from the spirit or scope of the invention, as expressed in the following claims.

What I claim is:

1. In a loom, a plurality of means for guiding and positioning a plurality of filling threads, a reed frame, a thread carrier movable across the reed frame, means on the reed frame for engaging one of said threads and positioning the thread in the path of movement of the thread carrier, and selector means for aligning any one of said thread guiding and said positioning means with the thread engaging means on the reed frame.

2. In a loom, means including a shiftable carriage and a plurality of thread supporting members thereon for guiding and positioning a plurality of filling threads, a reed frame, means fixed on the reed frame for engaging one of said threads, and selector means for shifting said carriage and aligning any one of said thread guiding and said positioning means with the thread engaging means on the reed frame.

3. In a loom, a plurality of means for guiding and positioning a plurality of filling threads, a reed frame, means fixed on the reed frame for engaging one of said threads, and selector means including a pattern selector chain and means controlled thereby for aligning any one of said thread guiding and said positioning means with the thread engaging means on the reed frame.

4. In a loom, means including a shiftable carriage and thread supporting members thereon for guiding and positioning a plurality of filling threads, a reed frame, means fixedly mounted on the reed frame for engaging one of said threads, and selector means including a pattern selector chain and means controlled thereby for shifting said carriage and aligning any one of said thread guiding and said positioning means with the thread engaging means on the reed frame.

5. In a loom, means for guiding and positioning a filling thread, a reed frame, a clamp thereon arranged to receive and clamp the thread from said guiding and positioning means as the reed frame is moved toward the front of the loom, means for elevating the thread positioning means as the reed frame reaches a predetermined position to pull the thread upwardly from the clamp, a shuttle and a clip on the shuttle for engaging the upwardly extending portion of the thread as the shuttle moves across the loom.

6. In a loom, a frame, a laterally movable carriage at each side of the loom, a plurality of thread supporting and positioning members carried by each carriage, a reed frame, a clamp thereon in line with each carriage, and selector means for shifting each carriage to position any one of the thread supporting and positioning means thereon in alignment with the clamp on the reed in line with said carriage.

7. In a loom, a frame, a laterally movable carriage at each side of the loom, a plurality of thread supporting and positioning members carried by each carriage, a reed frame, a clamp thereon in line with each carriage, selector means for shifting each carriage to position any one of the thread supporting and positioning means thereon in alignment with the clamp on the reed in line with said carriage, and means operative to elevate said thread supporting and positioning means when the filling thread selected is to be fed across the loom.

8. In a loom, a shiftable carriage, a plurality of needles for guiding and positioning a plurality of filling threads, said needles being supported on and movable with said carriage, a reed frame having means fixed thereon and engageable with the thread carried by a selected needle, and selector means for shifting the carriage and alining a selected needle with said thread engaging means on the reed frame.

9. In a loom, a shiftable carriage, a plurality of needles for guiding and positioning a plurality of filling threads, said needles being supported on and movable with said carriage, a reed frame having means fixed thereon and engageable with the thread carried by a selected needle, selector means for shifting the carriage and alining a selected needle with said thread engaging means on the reed frame, and a shuttle movable across the loom and having means for engaging and gripping the selected thread.

10. In a loom, a shiftable carriage, a plurality of needles for guiding and positioning a plurality of filling threads, said needles being supported on and movable with said carriage, a reed frame having means fixed thereon and engageable with the thread carried by a selected needle, selector means for shifting the carriage and alining a selected needle with said thread engaging means on the reed frame, a shuttle movable across the loom and having means for engaging and gripping the selected thread, means for clamping the free end of the thread after it has been fed across the loom by the shuttle, and means for tensioning the thread after it has been clamped.

11. In a loom, a shiftable carriage, a plurality of needles for guiding and positioning a plurality of filling threads, said needles being supported on and movable with said carriage, a reed frame having means fixed thereon and engageable with the thread carried by a selected needle, selector means for shifting the carriage and alining a selected needle with said thread engaging means on the reed frame, a shuttle movable across the loom and having means for engaging and gripping the selected thread, means for clamping the free end of the thread after it has been fed across the loom by the shuttle, and means carried by said carriage for tensioning the thread after it has been clamped.

12. In a loom, a shiftable carriage, a plurality of needles for guiding and positioning a plurality of filling threads, said needles being supported on and movable with said carriage, a reed frame having means fixed thereon and engageable with the thread carried by a selected needle, selector means for shifting the carriage and alining a selected needle with said thread engaging means on the reed frame, a shuttle movable across the loom and having means for engaging and gripping the selected thread, means for clamping the free end of the thread after it has been fed across the loom by the shuttle, means for tensioning the thread after it has been clamped, and means for clamping and cutting the thread at the other end of the lay from the clamping means first mentioned.

13. In a loom, a shiftable carriage movable transversely of the loom, a plurality of needles for guiding and positioning a plurality of filling threads, said needles being supported on and movable with said carriage, a reed frame having means fixed thereon and engageable with the thread carried by a selected needle, and selector means for shifting the carriage and alining a selected needle with said thread engaging means on the reed frame.

14. In a loom, a frame, a plurality of needles for guiding and positioning a plurality of filling threads at each side of the loom, selector mechanism for selecting any desired needle and thread for the filling thread, a shuttle having means engageable with the selected thread to carry the filling across the loom, and multiplier control mechanism for each selector mechanism, whereby the same thread can be repeated on successive picks in the same direction.

15. In a loom, a frame, a plurality of needles for guiding and positioning a plurality of filling threads at each side of the loom, a shiftable carriage at each side of the loom on which the needles are mounted, selector mechanism for shifting the carriage and selecting any desired needle and thread for the filling thread, a shuttle having means engageable with the selected thread to carry the filling across the loom, and multiplier control mechanism for each selector mechanism, whereby the same thread can be repeated on successive picks in the same direction.

16. In a loom, a frame, a plurality of needles for guiding and positioning a plurality of filling threads at each side of the loom, selector mechanism for selecting any desired needle and thread for the filling thread, a shuttle having means engageable with the selected thread to carry the filling across the loom, and multiplier control mechanism for each selector mechanism, whereby the carriage can be maintained in the same position on successive picks and the same thread can be repeated on successive picks in the same direction.

17. In a loom, a shiftable carriage, a plurality of needles for guiding and positioning a plurality of filling threads, said needles being supported on and movable with said carriage, a reed frame having means fixed thereon and engageable with the thread carried by a selected needle, selector means for shifting the carriage and alining a selected needle with said thread engaging means on the reed frame, a shuttle movable across the loom and having means for engaging and gripping the selected thread, and means controlled by the movement of the lay for tensioning the thread after it has been fed across the loom by the shuttle.

18. In a loom, a shiftable carriage, a plurality of needles for guiding and positioning a plurality of filling threads, said needles being supported on and movable with said carriage, a reed frame having means fixed thereon and engageable with the thread carried by a selected by a selected needle, selector means for shifting the carriage and alining a selected needle with said thread engaging means on the reed frame, a shuttle movable across the loom and having means for engaging and gripping the selected thread, and means carried by the carriage and controlled by the movement of the lay for tensioning the thread after it has been fed across the loom by the shuttle.

19. In a loom, a frame, a plurality of needles for guiding and positioning a plurality of filling threads at each side of the loom, and selector mechanism for selecting any desired needle and thread at either side of the loom, said selector mechanism comprising a plurality of control chains and means on one chain for controlling the selection of a needle and thread and means controlled by the other chain for causing a selected filling thread to be repeated on the next succeeding pick in the same direction.

EMIL R. PEDRAZZO.